United States Patent
Liaw et al.

(10) Patent No.: US 10,763,515 B2
(45) Date of Patent: Sep. 1, 2020

(54) PORTABLE WATER-ACTIVATED POWER GENERATING DEVICE

(71) Applicants: Kuo Ming Liaw, Taipei (TW); Sung-Nien Kao, Taipei (TW)

(72) Inventors: Kuo Ming Liaw, Taipei (TW); Sung-Nien Kao, Taipei (TW)

(*) Notice: Subject to any disclaimer, the term of this patent is extended or adjusted under 35 U.S.C. 154(b) by 176 days.

(21) Appl. No.: 15/831,612

(22) Filed: Dec. 5, 2017

(65) Prior Publication Data
US 2019/0173098 A1 Jun. 6, 2019

(51) Int. Cl.
| | |
|---|---|
| *H01M 6/32* | (2006.01) |
| *H01M 4/46* | (2006.01) |
| *H01M 6/36* | (2006.01) |
| *H01M 4/66* | (2006.01) |
| *H01M 2/36* | (2006.01) |
| *H01M 2/26* | (2006.01) |
| *H01M 2/16* | (2006.01) |
| *H01M 6/04* | (2006.01) |
| *H01M 2/02* | (2006.01) |
| H01M 4/02 | (2006.01) |

(52) U.S. Cl.
CPC .......... *H01M 6/32* (2013.01); *H01M 2/0207* (2013.01); *H01M 2/16* (2013.01); *H01M 2/26* (2013.01); *H01M 4/46* (2013.01); *H01M 4/463* (2013.01); *H01M 4/466* (2013.01); *H01M 6/04* (2013.01); *H01M 6/045* (2013.01); *H01M 6/36* (2013.01); *H01M 2/36* (2013.01); *H01M 4/661* (2013.01); *H01M 2004/028* (2013.01); *H01M 2220/10* (2013.01); *H01M 2300/0005* (2013.01)

(58) Field of Classification Search
CPC .......... H01M 6/32; H01M 6/36; H01M 4/463; H01M 4/661; H01M 2/36; H01M 2004/028
See application file for complete search history.

(56) References Cited

U.S. PATENT DOCUMENTS

| | | | | | |
|---|---|---|---|---|---|
| 3,293,078 | A | * | 12/1966 | Frye ........................ | H01M 4/02 429/119 |
| 3,966,497 | A | * | 6/1976 | Honer ...................... | H01M 4/02 429/119 |
| 4,020,247 | A | * | 4/1977 | Birt ......................... | H01M 4/60 429/119 |
| 4,822,698 | A | * | 4/1989 | Jackovitz ................ | H01M 4/46 429/118 |
| 2016/0226079 | A1 | * | 8/2016 | Kao ......................... | H01M 6/32 |
| 2017/0301927 | A1 | * | 10/2017 | Hsu ......................... | H01M 4/08 |

FOREIGN PATENT DOCUMENTS

| | | | |
|---|---|---|---|
| JP | 5972488 B1 | * | 8/2016 |
| JP | 2017000707 A | * | 1/2017 |

* cited by examiner

*Primary Examiner* — Jonathan G Jelsma
(74) *Attorney, Agent, or Firm* — WPAT, PC

(57) ABSTRACT

A portable water-activated power generating device, comprising a first supporting structure, a second supporting structure, a first electrode plate, a second electrode plate, a water-absorbent sheet, and a soft container. The second electrode plate has a first surface and a second surface opposite the first surface, and the water-absorbent sheet surrounds the second electrode plate and is in contact with the first surface and the second surface. The soft container is used for accommodating the second electrode plate and the water-absorbent sheet. The first electrode plate and the soft container are disposed between the first supporting structure and the second supporting structure.

19 Claims, 6 Drawing Sheets

PORTABLE WATER-ACTIVATED POWER GENERATING DEVICE

TECHNICAL FIELD

The present invention generally relates to a power generating device. More specifically, the present invention relates to a portable water-activated power generating device.

BACKGROUND

Market available consumer batteries such as button cell batteries or zinc-carbon batteries are generally called primary cells. These batteries are designed to be used once and then discarded. However, the heavy metals and electrolytes contained in primary cells are harmful to the environment and can result in environmental pollution when the primary cells are discarded. For example, if electrolytes contained in the primary cells leak out, this may cause a chemical reaction with water, which will then produce toxic substances.

In recent years, there has been significant progress in the research on alternatives to traditional primary cells. A water-activated power generating device, generally known as a water battery, is an example of the alternatives. Unlike traditional primary cells, a water battery is made of materials that are environmentally friendly, which means that when a water battery is discarded, the materials contained in the water battery can be easily recycled and do not produce toxic substances.

However, existing water batteries have some disadvantages. A traditional water battery often has a container for holding water, and the container needs to be carefully sealed to prevent the water in the container from leaking out. The water in the container reduces the portability of existing water batteries because a user usually has to be more careful when carrying a container filled with water together with his/her valuable belongings.

Another disadvantage is that the wastes produced during chemical reactions are usually deposited within the container of the water battery, and the wastes will affect the efficiency of chemical reactions and thus reduce the overall life span of the water battery. Furthermore, the wastes are usually difficult to clean up. Therefore, there is a need to develop a water-activated power generating device that overcomes the above-mentioned advantages.

SUMMARY

The devices of the present invention each have several aspects, no single one of which is solely responsible for its desirable attributes. Without limiting the scope of the present invention, its more prominent features will now be discussed briefly. After considering this discussion, and especially after reading the section titled "Detailed Description of Certain Embodiments" one will understand how the features of the present invention provide advantages over other water batteries.

The embodiments of the present disclosure provide a portable water-activated power generating device. The portable water-activated power generating device comprises a first supporting structure, a second supporting structure, a first electrode plate, a second electrode plate, a water-absorbent sheet, and a soft container. The second electrode plate has a first surface and a second surface opposite the first surface, and the water-absorbent sheet surrounds the second electrode plate and is in contact with the first surface and the second surface. The soft container is used for accommodating the second electrode plate and the water-absorbent sheet. The first electrode plate and the soft container are disposed between the first supporting structure and the second supporting structure.

In some embodiments, the first supporting structure comprises a plurality of holes. In some embodiments, the second supporting structure comprises a plurality of holes. In some embodiments, the portable water-activated power generating device further comprises a first fastening component and a second fastening component for fastening the first supporting structure and the second structure.

DETAILED DESCRIPTION OF CERTAIN EMBODIMENTS

The following detailed description is directed to specific embodiments of the present invention. However, the present invention can be implemented in a multitude of different ways. In this description, reference is made to the drawings, wherein corresponding parts are designated with numerals throughout.

Figure 1:
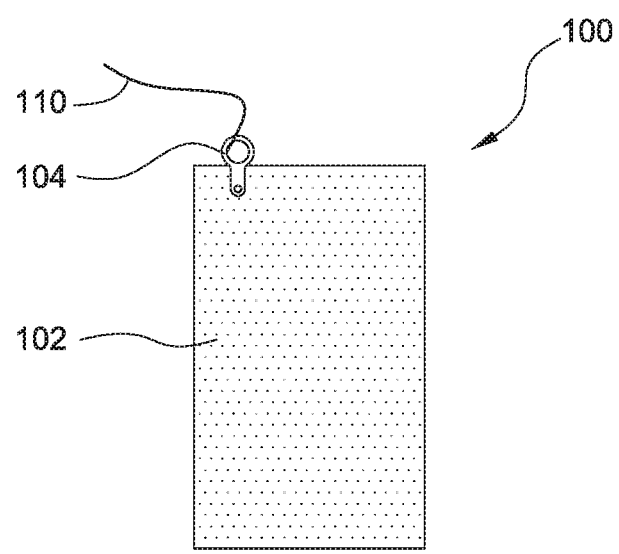
FIG. 1 is a schematic view of an electrode module of a portable water-activated power generating device according to an embodiment of the present invention.

FIG. 1 is a schematic view of an electrode module of a portable water-activated power generating device according to an embodiment of the present invention. Please note that the components shown in FIG. 1 are not drawn to scale and are solely for illustrative purposes. Referring to FIG. 1, the electrode module 100 comprises an electrode plate 102, a terminal 104 and a conductive line 110. The electrode plate 102 has a substantially rectangular shape. It is contemplated that the electrode plate 102 may include shapes other than the above. The terminal 104 is made of conductive materials and is fixed to the electrode plate 102. The terminal 104 and the conductive line 110 are capable of providing currents to external electrical devices during chemical reactions within the portable water-activated power generating device.

The electrode plate 102 may be, but is not limited to, a carbon (C) electrode plate 102. In an embodiment, the electrode plate 102 comprises carbon (C), nickel (Ni) and conductive meshes (not shown). In some embodiments, the electrode plate 102 may comprise at least one of polytetrafluoroethylene (PTFE), super-conductive carbon black and graphite. The above-mentioned materials enable the electrode plate 102 to produce more complete chemical reactions, which increases the life of the portable water-activated power generating device. In some embodiments, the electrode plate 102 is flexible. In some embodiments, the terminal 104 is made of metal and is processed to be both acid-resistant and alkali-resistant. In some embodiments, the terminal 104 is processed to be rust-resistant. In some embodiments, the terminal 104 is made of stainless steel.

Figure 2A:
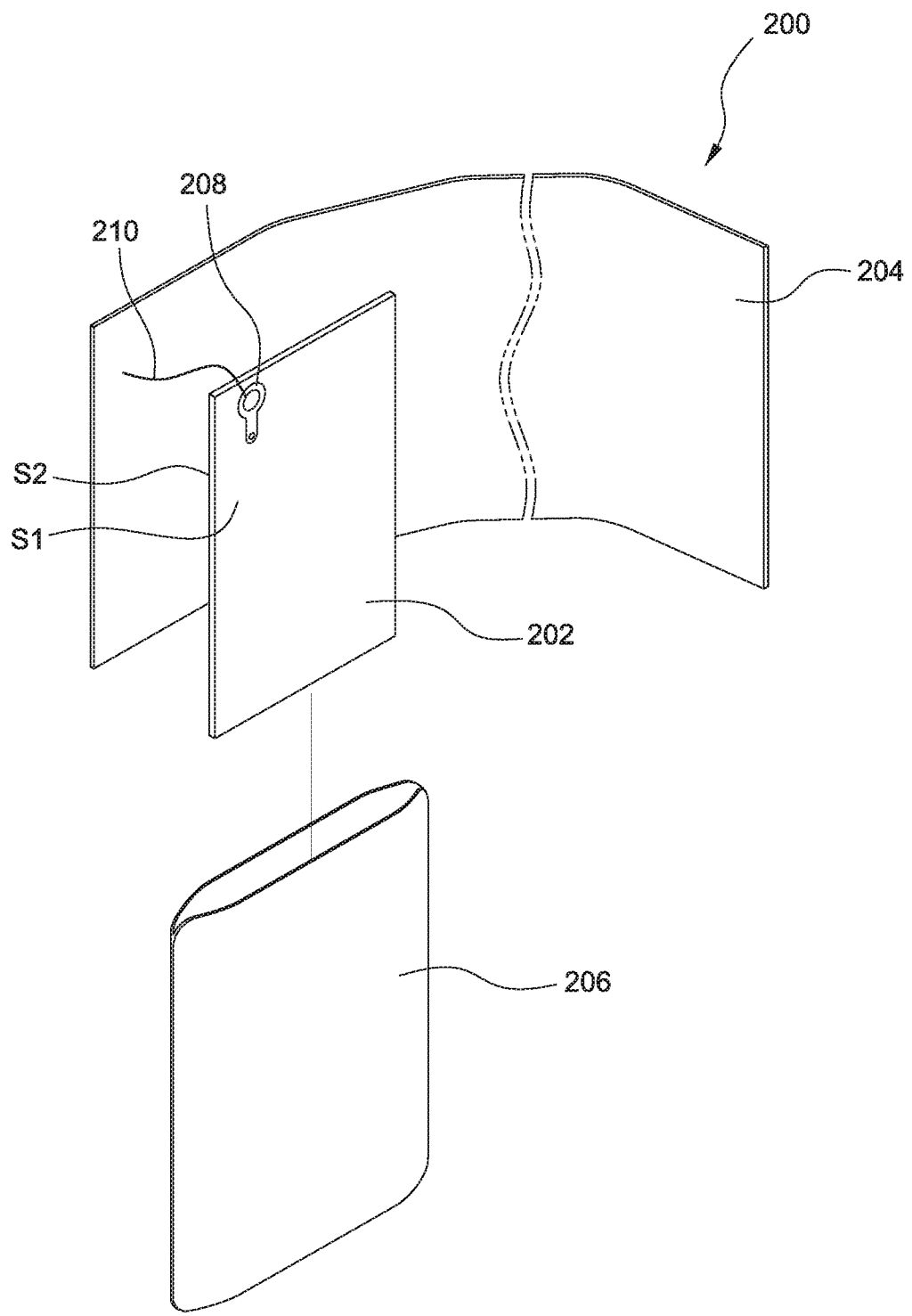
FIGS. 2A and 2B are schematic views of a fuel module of a portable water-activated power generating device according to an embodiment of the present invention.
Figure 2B:
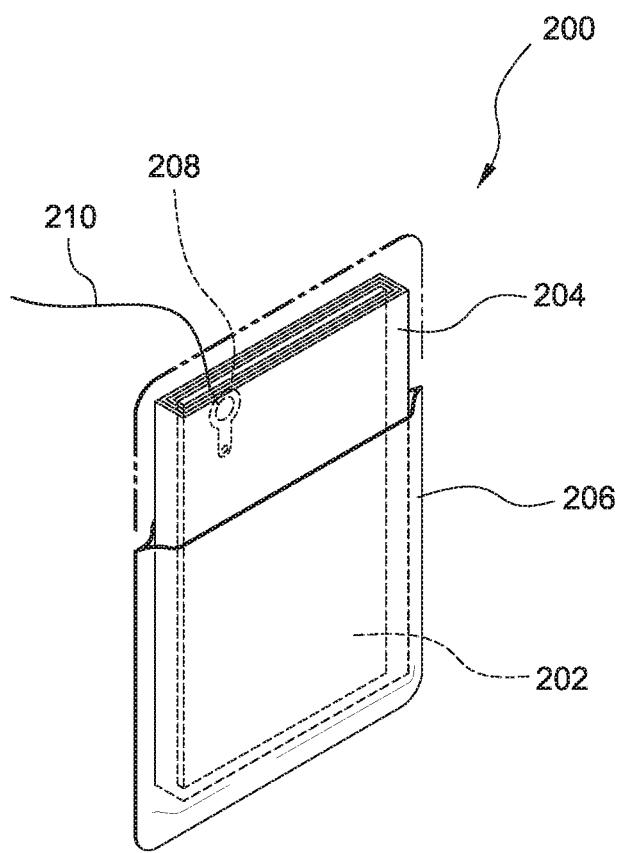

FIGS. 2A and 2B are schematic views of a fuel module of a portable water-activated power generating device according to an embodiment of the present invention. Please note that the components shown in FIGS. 2A and 2B are not drawn to scale and are solely for illustrative purposes. Referring to FIG. 2A, the fuel module 200 includes an electrode plate 202 having a first surface S1 and a second surface S2, a water-absorbent sheet 204, a soft container 206, a terminal 208, and a conductive line 210.

In some embodiments, the electrode plate 202 is a magnesium (Mg) electrode plate 202. In some embodiments, the electrode plate 202 is made of magnalium comprising aluminium (Al) and magnesium (Mg). In some embodiments, the percentage of aluminium (Al) in the second electrode plate 202 is around 2% to 3%. In some embodiments, the percentage of aluminium (Al) in the second electrode plate 202 is around 3% to 4%. In some embodiments, the percentage of aluminium (Al) in the second electrode plate 202 is less than 5%.

Referring to FIG. 2A, the terminal 208 is fixed to the second electrode plate 202. In some embodiments, the terminal 208 is made of metal and is processed to be both acid-resistant and alkali-resistant. In some embodiments, the terminal 208 is processed to be rust-resistant. In some embodiments, the terminal 208 is made of stainless steel. The terminal 208 and the conductive line 210 are capable of providing currents to external electrical devices during chemical reactions within the portable water-activated power generating device.

Referring to FIGS. 2A and 2B, the water-absorbent sheet 204 surrounds the second electrode plate 202 and is in contact with the first surface S1 and the second surface S2. In some embodiments, at least one layer of the water-absorbent sheet 204 is disposed on the first surface S1. In some embodiments, at least one layer of the water-absorbent sheet 204 is disposed on the second surface S2. In some embodiments, three layers of the water-absorbent sheet 204 are disposed on the first surface S1. In some embodiments, three layers of the water-absorbent sheet 204 are disposed on the second surface S2.

In some embodiments, the water-absorbent sheet 204 is made of bibulous paper. The volume of water that bibulous paper can absorb is 2.5 times more than ordinary paper. Since bibulous paper is very thin and is a highly water-absorbent type of paper, the portable water-activated power generating device can be slimmer in size than traditional water batteries. In an embodiment, the water-absorbent sheet 204 is processed to comprise sodium (Na) ions. The Na ions contained in the water-absorbent sheet 204 can facilitate the chemical reactions within the portable water-activated power generating device. Furthermore, the user only needs to add a small amount of water to the portable water-activated power generating device before it can generate power; no additional electrolytes would be necessary.

Referring to FIGS. 2A and 2B, the soft container 206 accommodates the second electrode plate 202 and the water-absorbent sheet 204. In some embodiments, wastes produced by the second electrode plate 202 during chemical reactions will be deposited within the soft container 206. Therefore, when a user finds that the power generated by the portable water-activated power generating device decreases, the user can easily replace the used fuel module 200 with a new fuel module 200. The soft container 206 can prevent wastes produced by the second electrode plate 202 during chemical reactions from contaminating the other components of the portable water-activated power generating device. In some embodiments, the soft container 206 is a bag made of paper.

Figure 3A:
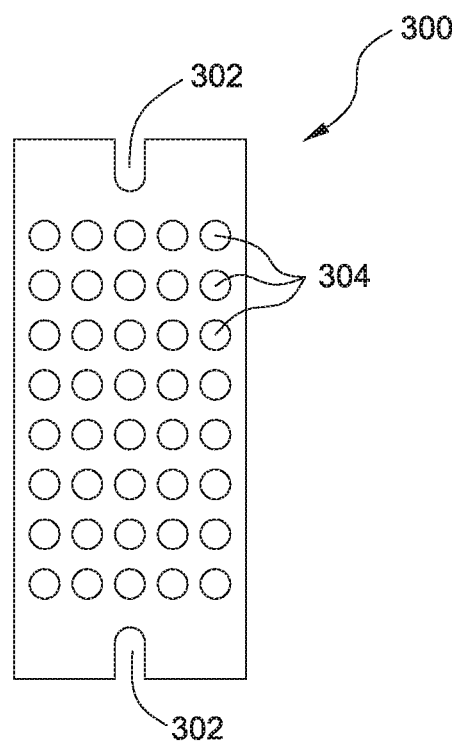
FIG. 3A is a schematic view of a supporting structure of a portable water-activated power generating device according to an embodiment of the present invention.

FIG. 3A is a schematic view of a supporting structure of a portable water-activated power generating device according to an embodiment of the present invention. Please note that the components shown in FIG. 3A are not drawn to scale and are solely for illustrative purposes. Referring to FIG. 3A, the supporting structure 300 has a substantially rectangular shape and comprises two recesses 302 and a plurality of holes 304. It is contemplated that the supporting structure 300 may have shapes other than a substantially rectangular shape. The plurality of holes 304 has a substantially circular shape. It is contemplated that plurality of holes 304 may have shapes other than a substantially circular shape.

In some embodiments, the supporting structure 300 is made of electrical insulating material. In some embodiments, the supporting structure 300 is made of waterproof material. In some embodiments, the supporting structure 300 is made of acrylic or plastic. Air or gas can pass through the plurality of holes 304 during the chemical reactions within the portable water-activated power generating device. In some embodiments, two adjacent holes of the plurality of holes 304 in the horizontal direction or the vertical direction are arranged in an equal distance.

Figure 3B:
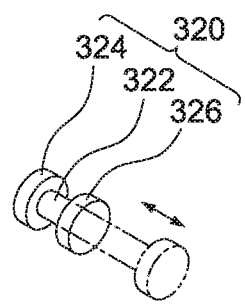
FIG. 3B is a schematic view of a fastening component of a portable water-activated power generating device according to an embodiment of the present invention.

FIG. 3B is a schematic view of a fastening component of a portable water-activated power generating device according to an embodiment of the present invention. Please note that the components shown in FIG. 3B are not drawn to scale and are solely for illustrative purposes. Referring to FIG. 3B, the fastening component 320 comprises a body portion 322, a first end 324, and a second end 326. In some embodiments, the body portion 322 is flexible and stretchable. In some embodiments, the first end 324 is removably buckled to the recess 302 of one supporting structure 300, and the second end 326 is removably buckled to the recess 302 of another supporting structure 300. In some embodiments, the first end 324 is fixed to the recess 302 of one supporting structure 300, and the second end 326 is removably buckled to the recess 302 of another supporting structure 300.

Figure 4:
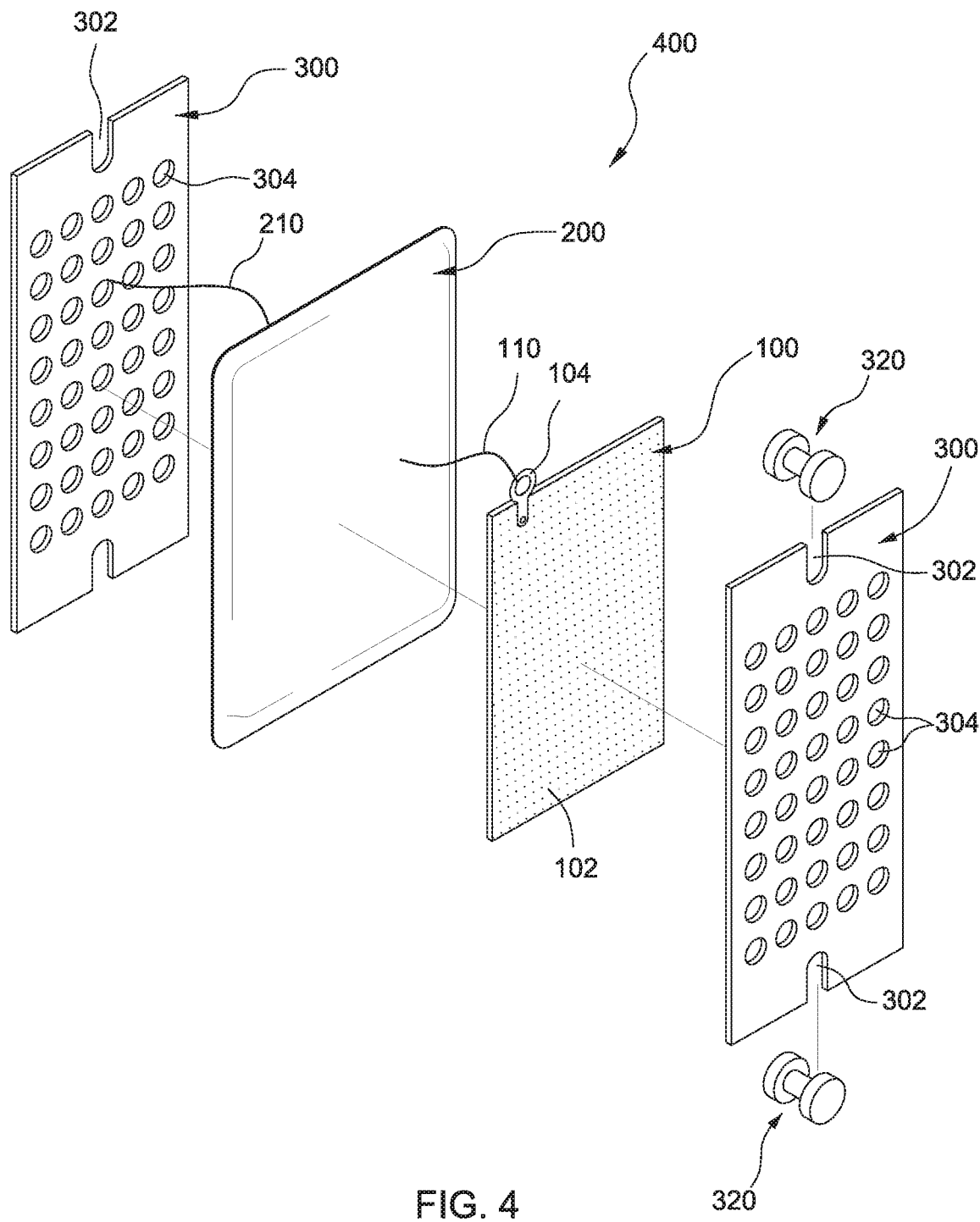
FIG. 4 is an exploded diagram of a portable water-activated power generating device according to an embodiment of the present invention.

FIG. 4 is an exploded diagram of a portable water-activated power generating device according to an embodiment of the present invention. Please note that the components shown in FIG. 4 are not drawn to scale and are solely for illustrative purposes. Referring to FIG. 4, the portable water-activated power generating device 400 comprises two supporting structures 300, an electrode module 100, a fuel module 200, and two fastening components 320. The electrode module 100 and the fuel module 200 are disposed between the two supporting structures 300. The two fastening components 320 are used for fastening the two supporting structures 300 and the electrode module 100 and the fuel module 200 therebetween.

After a small amount of water is poured into the fuel module 200, the water-absorbent sheet 204 absorbs the water and holds the water within it. The water within the water-absorbent sheet 204 acts as a suitable medium for the electrode plates 102 and 202 to have chemical reactions. When the surfaces of the electrode plates 102 and 202 are exposed to the water, the electrode plate 202 releases anions (negatively charged ions) and the electrode plate 102 releases cations (positively charged ions). The interactions between the anions and the cations generate an electric potential difference. When the portable water-activated power generating device 400 generates power, the electrode plate 102 acts as a cathode and the electrode plate 202 acts as an anode.

Referring to FIG. 4, the two ends of the fastening component 320 are removably buckled to the recesses 302 of the supporting structures 300. Therefore, when a user finds that the power generated decreases, the user can easily disassemble the portable water-activated power generating device 400 and then replace the used fuel module 200 with a new fuel module 200. The fastening components 320 and the supporting structures 300 can prevent the electrode plate 102 from deformation during chemical reactions and can also ensure that the electrode module 100 and the fuel module 200 are in good contact with each other during chemical reactions.

Figure 5:
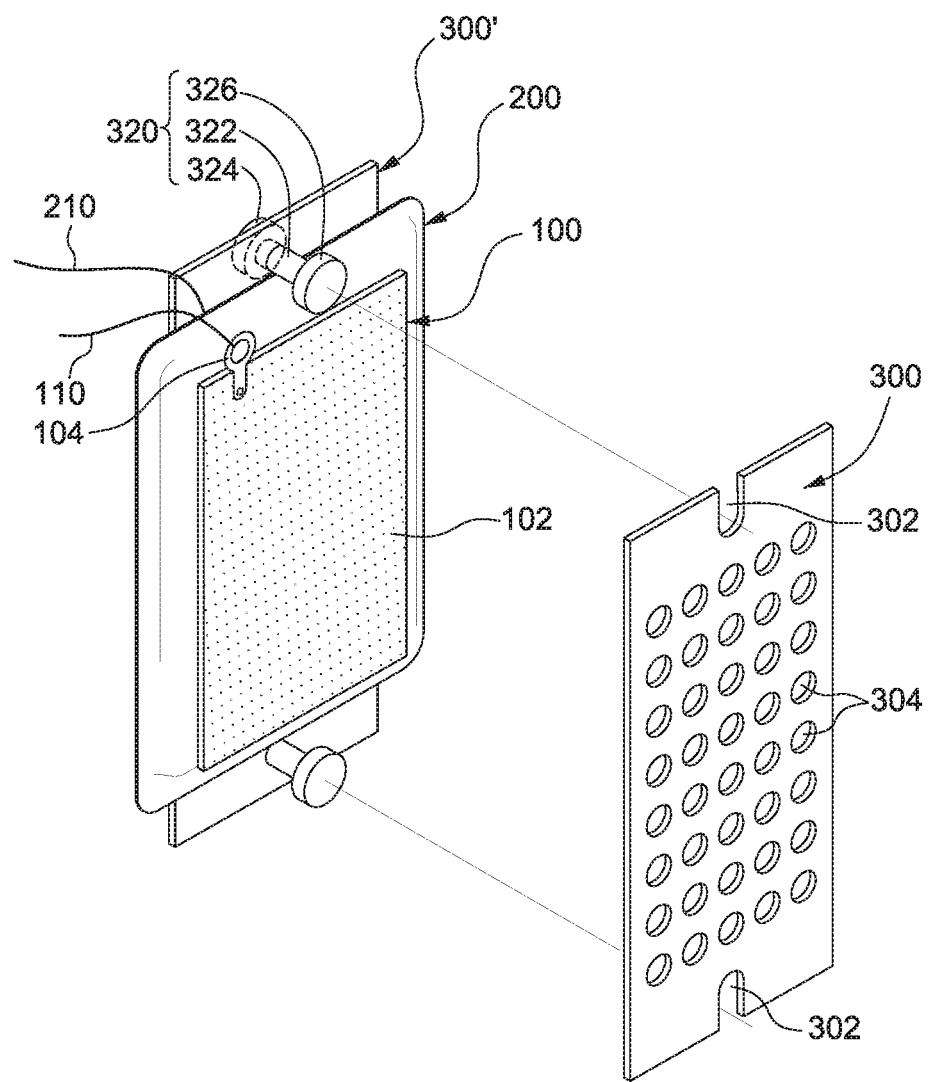
FIG. 5 is schematic view of supporting structures and fastening components of a portable water-activated power generating device according to an embodiment of the present invention.

FIG. 5 is schematic view of supporting structures and fastening components of a portable water-activated power generating device according to an embodiment of the present invention. Please note that the components shown in FIG. 5 are not drawn to scale and are solely for illustrative purposes. Referring to FIG. 5, in some embodiments, the first ends 324 of the two fastening components 320 are respectively fixed to the top and the bottom of the supporting structure 300', and the second ends 326 of the two fastening components 320 are removably buckled to the recess 302 of supporting structure 300.

Although specific embodiments of the present invention have been disclosed herein, it is not intended that the present invention be limited to the disclosed embodiments. Those skilled in the art would recognize that modifications and variations can be made to these embodiments without departing from the spirit of the present invention. It is intended that the present invention encompasses all such modifications and variations that fall within the scope of the appended claims.

What is claimed is:

1. A portable water-activated power generating device, comprising:
    a first supporting structure;
    a second supporting structure;
    a first electrode plate;
    a second electrode plate having a first surface and a second surface opposite the first surface;
    a water-absorbent sheet surrounding the second electrode plate and in contact with the first surface and the second surface;
    a soft container for accommodating the second electrode plate and the water-absorbent sheet; and
    a first fastening component and a second fastening component for fastening the first supporting structure to the second supporting structure;
    wherein the first electrode plate and the soft container are disposed between the first supporting structure and the second supporting structure, a first end of the first fastening component is buckled to a first top recess at a top of the first supporting structure, and a first end of the second fastening component is buckled to a first bottom recess at a bottom of the first supporting structure.

2. The device of claim 1, wherein the first supporting structure comprises a plurality of holes.

3. The device of claim 2, wherein the second supporting structure comprises a plurality of holes.

4. The device of claim 2, wherein each of the plurality of holes of the first supporting structure is, in the horizontal direction or the vertical direction, spaced apart from each other by an equal distance.

5. The device of claim 1, wherein a second end of the first fastening component is fixed to a top of the second supporting structure, and a second end of the second fastening component is fixed to a bottom of the second supporting structure.

6. The device of claim 1, wherein a second end of the first fastening component is buckled to a second top recess at a top of the second supporting structure, and a second end of the second fastening component is buckled to a second bottom recess at a bottom of the second supporting structure.

7. The device of claim 1, wherein a body portion of each of the first fastening component and second fastening component is flexible and stretchable.

8. The device of claim 1, further comprising a first terminal disposed on the first electrode plate and a second terminal disposed on the second electrode plate.

9. The device of claim 1, wherein the water-absorbent sheet is disposed on the first surface of the second electrode plate.

10. The device of claim 9, wherein the water-absorbent sheet is disposed on the second surface of the second electrode plate, and wraps the second electrode plate in three layers.

11. The device of claim 1, wherein the first electrode plate comprises at least one of polytetrafluoroethylene (PTFE), super-conductive carbon black, and graphite.

12. The device of claim 1, wherein the water-absorbent sheet is made of bibulous paper and comprises sodium (Na) ions.

13. The device of claim 1, wherein the soft container is a bag made of paper.

14. The device of claim 1, wherein the second electrode plate is made of magnalium comprising aluminium (Al) and magnesium (Mg).

15. The device of claim 14, wherein the percentage of aluminium (Al) in the second electrode plate is around 2% to 3%.

16. The device of claim 14, wherein the percentage of aluminium (Al) in the second electrode plate is around 3% to 4%.

17. The device of claim 14, wherein the percentage of aluminium (Al) in the second electrode plate is less than 5%.

18. The device of claim 1, wherein the first fastening component and the second fastening component are dumbbell-shaped.

19. The device of claim 1, wherein the first fastening component and the second fastening component are capable of being un-buckled to remove the soft container from the device.

* * * * *